US012091891B2

(12) United States Patent
Bauer

(10) Patent No.: US 12,091,891 B2
(45) Date of Patent: Sep. 17, 2024

(54) DOMESTIC DISHWASHING MACHINE AND DOOR LATCH THEREFOR

(71) Applicant: emz-Hanauer GmbH & Co. KGaA, Nabburg (DE)

(72) Inventor: Matthias Bauer, Schmidgaden (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 429 days.

(21) Appl. No.: 17/391,487

(22) Filed: Aug. 2, 2021

(65) Prior Publication Data

US 2022/0065008 A1 Mar. 3, 2022

(30) Foreign Application Priority Data

Aug. 31, 2020 (DE) ..................... 10 2020 122 689.6

(51) Int. Cl.
*E05C 3/12* (2006.01)
*A47L 15/42* (2006.01)
*E05C 3/00* (2006.01)

(52) U.S. Cl.
CPC ............ *E05C 3/12* (2013.01); *A47L 15/4259* (2013.01); *E05C 3/006* (2013.01)

(58) Field of Classification Search
CPC ..... E05C 1/00; E05C 1/08; E05C 3/00; E05C 3/006; E05C 3/12; E05C 5/00
See application file for complete search history.

(56) References Cited

U.S. PATENT DOCUMENTS 7,690,700 B2 4/2010 Neumann
8,276,951 B2 10/2012 Dirnberger et al.
10,806,322 B2 10/2020 Dirnberger et al.
2017/0051535 A1* 2/2017 Olson ................... E05C 19/026
2018/0000312 A1* 1/2018 Dirnberger ............. E05C 19/02

FOREIGN PATENT DOCUMENTS

CN 106255790 A 12/2016
DE 102006037494 A1 2/2008
DE 102007044577 A1 4/2009
DE 102016008317 A1 1/2018
EP 2578134 A2 4/2013

OTHER PUBLICATIONS

DE Office Action in co-pending application DE 102020122689.6, mail date Jun. 30, 2021.

* cited by examiner

*Primary Examiner* — Rita P Adhlakha
(74) *Attorney, Agent, or Firm* — Hayes Soloway PC

(57) ABSTRACT

A domestic dishwashing machine includes a machine body having a dishwashing chamber formed therein, a door for closing the dishwashing chamber, which door is mounted on the machine body so as to be pivotable about a horizontal pivot axis close to the floor, and a door latch for holding the door closed, having a latch assembly installed in a body roof above the dishwashing chamber and includes a one-piece closing member arranged to be movable between an open position and a closed position, and a closing spring arrangement supported on the closing member and which, in the open position of the closing member, urges the closing member into blocking engagement with a blocking surface that prevents relaxation of the closing spring arrangement, and comes into gripping engagement with an engagement structure arranged on the door and pulls the door shut under the action of the relaxing closing spring arrangement.

14 Claims, 6 Drawing Sheets

DOMESTIC DISHWASHING MACHINE AND DOOR LATCH THEREFOR

BACKGROUND OF THE INVENTION

1. Field of the Invention

The present invention relates generally to door latch for a domestic dishwashing machine.

2. Description of the Prior Art

A door latch for installation in a domestic electrical appliance is known from DE 10 2006 037 494 B4, wherein in the known door latch, on closing of the door, an elongate closing member having a closing lug enters a depression formed on the door. As the door closes, it pushes against a control lever, which is separate from the closing member, and sets the control lever in rotation. The control lever in turn strikes against the closing member and frees it from blocking engagement with an abutment surface against which the closing member is urged by a closing spring when the door is open. As soon as the closing member is freed from blocking engagement with the abutment surface, the closing spring is able to relax. The closing member is thereby pulled back into a closed position. Since the closing lug of the closing member has in the meantime entered the door depression, the closing member takes the door with it as it is pulled back. The door is thereby pulled shut with the compression of a door seal, for which reason the door latch disclosed in the mentioned DE specification is a representative of the category of pull-shut latches.

In dishwashing machines for domestic use, the door is increasingly used to accommodate control electronics and display and operating elements. This limits the space available for accommodating components of a door latch in the door of the dishwashing machine. Therefore, in many dishwashing machines, a main assembly of the door latch is accommodated in the body of the machine, namely in a body roof above the dishwashing chamber of the dishwashing machine. Although the body roof offers a comparatively large installation space in terms of depth, that is to say in the direction horizontally backwards from the point of view of a user standing in front of the dishwashing machine, the space available in the body roof is usually limited in terms of height. Door latches as are disclosed in DE 10 2006 037 494 B4 are particularly suitable for installation in dishwashing machines because the elongate closing member, owing to its comparatively small overall height and owing to its comparatively small movement stroke which is necessary for releasing the blocking engagement with the abutment surface, can readily be accommodated inside the body roof.

As well as the requirement to address the question of the available installation space in the domestic appliance in question, there is the problem when designing a door latch for a domestic appliance that the installation of the door latch should not unduly weaken bearing or other structurally important wall parts of the domestic appliance. If, for example, the installation of the door latch requires a large cutout to be introduced into a body wall, this can weaken the stability of the body as a whole.

SUMMARY OF THE INVENTION

It is an object of the present invention to provide a domestic dishwashing machine in which the installation of a door latch is to impair the structural stability of the machine as little as possible.

In achieving this object the invention starts from a domestic dishwashing machine which comprises: a machine body having a dishwashing chamber formed therein; a door for closing the dishwashing chamber, which door is mounted on the machine body so as to be pivotable about a horizontal pivot axis close to the floor; and a door latch for holding the door closed, having a latch assembly installed in a body roof above the dishwashing chamber, wherein the latch assembly comprises a one-piece closing member arranged so as to be movable between an open position and a closed position, and a closing spring arrangement which is supported on the closing member and which, in the open position of the closing member, urges the closing member into blocking engagement with a blocking surface, which blocking engagement prevents relaxation of the closing spring arrangement, wherein the closing member has a contact surface for a blocking-release element which, on closing of the door, pushes against the contact surface and thereby frees the closing member from blocking engagement with the blocking surface, wherein the closing member, on closing of the door, comes into gripping engagement with an engagement structure arranged on the door and pulls the door shut under the action of the relaxing closing spring arrangement.

According to the invention it is provided in such a dishwashing machine that the engagement structure is formed by a closing shackle which at the same time forms the blocking-release element, which closing shackle protrudes from a first wall portion, extending substantially parallel to the plane of the door, of an inner lining of the door, and that the closing shackle forms a shackle crosspiece which extends substantially horizontally and is in advance on closing of the door and behind which the closing member engages on closing of the door. The use of a closing shackle having a shackle crosspiece behind which a gripping component engages on closing of the door of a domestic appliance is in itself a conventional measure from the field of door latches for domestic electrical appliances. The important factor within the scope of the invention is that such a closing shackle is arranged on the door, specifically on a wall portion (first wall portion) of an inner lining of the door that is substantially parallel to the plane of the door. In conjunction with a one-piece closing member accommodated in the body roof, the closing shackle on the door side allows the latch assembly to be installed in the body roof in such a manner that a cutout of only a comparatively small size has to be introduced into the outside walls of the body roof and thus the structure of the body roof is weakened only minimally. In the solution according to the invention, the closing shackle is both the engagement structure and the blocking-release element. On closing of the door, the closing shackle pushes against the closing member directly and thereby initiates a movement stroke of the closing member that is required for releasing the blocking. As part of this blocking-releasing movement stroke, the closing member engages behind the shackle crosspiece of the closing shackle and thus establishes the condition that the closing member pulls the door with it during its subsequent return movement effected by relaxation of the closing spring arrangement. It is sufficient to provide on the body roof, in a front wall, that is to say a wall that faces a user standing in front of the dishwashing machine, a cutout which the closing shackle can enter on closing of the door. The solution according to the invention does not require the cutout to extend into the region of a roof bottom wall. The cutout can remain limited to the region of the front wall of the body roof. This benefits the structural stability of the body roof.

In some embodiments, the closing shackle is inserted from behind through a wall aperture in the first wall portion. For example, the closing shackle can be formed by a shackle body which is designed with one or more screw receivers. On mounting of the door latch, a mounting screw is screwed into each of the screw receivers from the outside (i.e. from the side that is visible from outside) of the first wall portion through a corresponding mounting hole in the first wall portion. Only the closing shackle protrudes from the wall aperture. The screw receivers remain concealed behind the first wall portion. The shackle body can be, for example, an injection-moulded member manufactured from plastics material.

In some embodiments, the inner lining has a wall step which is formed by the first wall portion and a second wall portion extending transversely (perpendicularly or obliquely) relative to the door plane beneath the closing shackle. A gap is thereby formed between the closing shackle and the second wall portion, which gap can be, for example, at least 3 mm or at least 4 mm or at least 5 mm or at least 6 mm.

In some embodiments, the body roof has in a front wall a wall opening which the closing shackle enters on closing of the door. On the underside of the roof, a roof bottom wall adjoins the front wall, wherein the wall opening ends before the transition of the front wall into the roof bottom wall, for example at a distance of at least 1 mm or at least 2 mm or at least 3 mm or at least 4 mm. For example, the wall opening can end at a distance of approximately from 3 to 5 mm before the transition of the front wall into the roof bottom wall.

In some embodiments, the striking of the closing shackle against the contact surface of the closing member on closing of the door initiates a tilting of the closing member that leads to the release of the blocking engagement. The subsequent relaxation of the closing spring arrangement effects a substantially translational displacement of the closing member in a direction deeper into the body roof into the closed position of the closing member. Both the tilting and the translational displacement are thereby carried out by the closing member as a whole.

In some embodiments, the latch assembly comprises a frame having mounting structures for fastening the frame to a structural component of the body roof. In such embodiments, the latch assembly further comprises a housing member which is supported on the frame and in which the closing member is arranged so as to be movable between its open position and its closed position, wherein the blocking surface is arranged stationarily relative to the housing member. The housing member is supported on the frame so as to be movable, in particular pivotable, relative thereto, such that, when the door is open, a change of position, in particular a vertical change of position, of the contact surface of the closing member relative to the frame can be brought about by movement of the housing member relative to the frame.

In the above embodiment, the housing member is supported on the frame with movement play relative thereto. This movement play can be used to compensate for any mounting tolerances of the closing shackle (or generally: of the blocking-release element). Such mounting tolerances can originate from tolerances of the closing shackle (blocking-release element) on mounting on the door or/and from tolerances on mounting of the door on the machine body. By mounting the housing member on the frame with play, self-alignment of the housing member, and thus of the closing member, relative to the closing shackle can be achieved on closing of the door. A centring bevel can thereby be formed on the housing member, which centring bevel serves to cooperate with the closing shackle in order to centre the housing member relative to the closing shackle. If required, a plurality of such centring bevels can be formed on the housing member in order to be able to exert a centring action on the closing shackle in different directions.

According to a further aspect, the invention provides a door latch for a domestic electrical appliance, for example a dishwashing machine, wherein the door latch comprises: a housing member; a one-piece closing member arranged in the housing member so as to be movable between an open position and a closed position; and a closing spring arrangement which is supported on the closing member and which, in the open position of the closing member, urges the closing member into blocking engagement with a blocking surface arranged stationarily relative to the housing member, which blocking engagement prevents relaxation of the closing spring arrangement. The closing member forms a gripping mouth, delimited by an upper and a lower jaw structure, for a closing shackle which, on closing of the door, pushes against one of the upper and lower jaw structures and thereby initiates a tilting of the closing member that leads to the release of the blocking engagement. The subsequent relaxation of the closing spring arrangement effects a substantially translational displacement of the closing member relative to the housing member into the closed position. On closing of the door, the other of the upper and lower jaw structures engages behind the shackle crosspiece of the closing shackle. Both the tilting and the translational displacement are carried out by the closing member as a whole.

According to yet a further aspect, the invention provides a domestic electrical appliance which is in the form of, for example, a dishwashing machine. The domestic appliance comprises: an appliance body having a process chamber formed therein; a door for closing the process chamber, which door is movably mounted on the appliance body; and a door latch for holding the door closed. The process chamber is a chamber in which a working process performed by the domestic appliance takes place. The working process is, for example, a cleaning process, as is the case in dishwashing machines or laundry washing machines. However, the domestic appliance is not limited to such cleaning appliances; the domestic appliance can likewise be, for example, a tumble dryer or an electric oven. In such cases, the process chamber is formed by a drying chamber or a cooking chamber, respectively. The door latch comprises a latch assembly installed in the appliance body, wherein the latch assembly comprises a frame having mounting structures for fastening the frame to a structural component of the appliance body. The structural component is, for example, formed by a wall portion of sheet metal. The latch assembly further comprises a housing member supported on the frame, a closing member, in particular in one-piece form, arranged in the housing member so as to be movable between an open position and a closed position, and a closing spring arrangement supported on the closing member. In the open position of the closing member, the closing spring arrangement urges the closing member into blocking engagement with a blocking surface arranged stationarily relative to the housing member, which blocking engagement prevents relaxation of the closing spring arrangement. The closing member has a contact surface for a blocking-release element which is arranged on the door and which, on closing of the door, pushes against the contact surface and thereby frees the closing member from blocking engagement with the blocking surface. On closing of the door, the closing member comes into gripping engagement with an engagement structure arranged on the door and pulls the door shut under the action of the relaxing closing spring arrangement. According to the invention, the housing member is supported on the frame so as to be movable relative thereto, namely such that, when the door is open, a change of position of the contact surface of the closing member relative to the frame can be brought about by movement of the housing member relative to the frame.

In some embodiments, the housing member is supported on the frame so as to be pivotable relative thereto and, by pivoting, makes possible a vertical change of position of the contact surface.

The invention will be explained in greater detail hereinbelow with reference to the accompanying drawings.

DETAILED DESCRIPTION OF THE INVENTION

Figure 1:
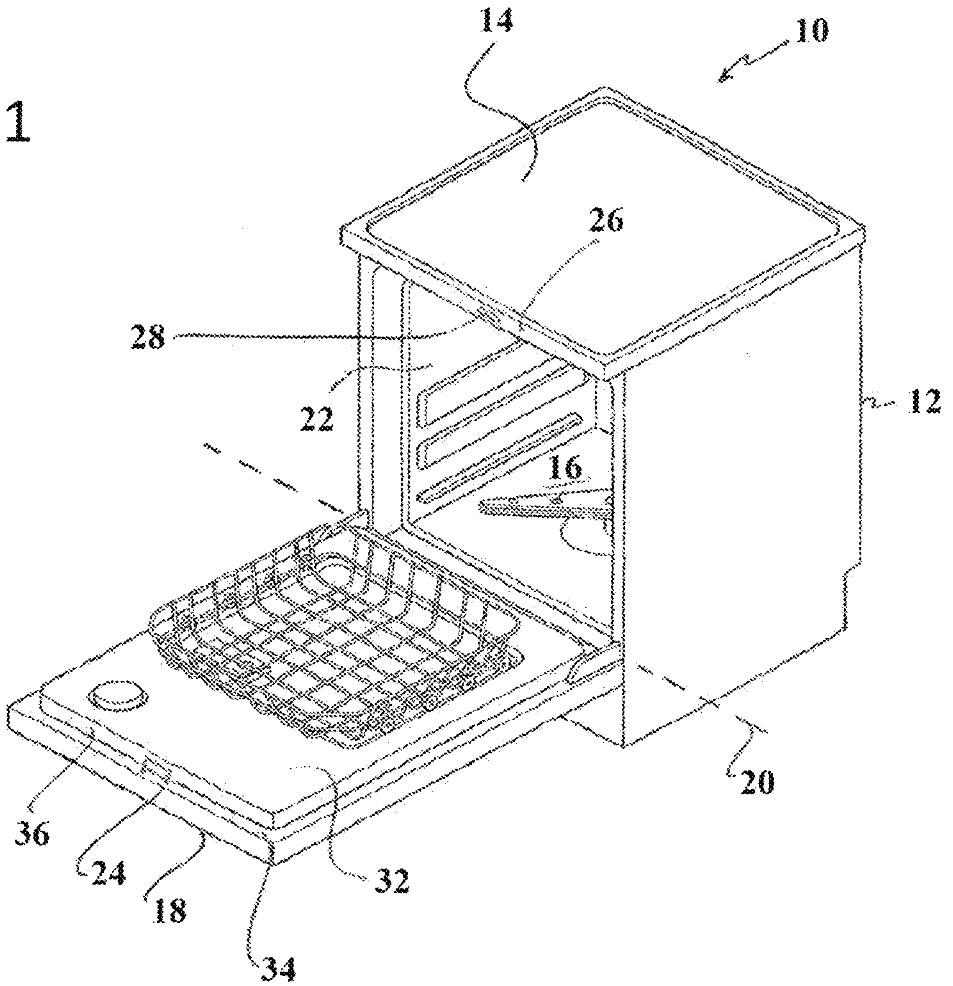
FIG. 1 is a perspective view of an example of a dishwashing machine for domestic use.

Reference will first be made to FIG. 1. A dishwashing machine designated generally 10, as is suitable for use in a private household, is shown therein. The dishwashing machine 10 comprises a machine body 12 having a body roof 14 beneath which there is formed in the machine body a dishwashing chamber 16 which can be fitted in the conventional manner with one or more baskets for receiving dishes or/and cutlery. A door 18 is mounted on the machine body 12 so as to be pivotable about a horizontal pivot axis 20, depicted by a broken line, close to the floor. The door 18 serves to close an access opening 22 to the dishwashing chamber 16.

On the door 18 there is mounted a closing shackle 24 which, on closing of the door 18, cooperates with a latch assembly (not shown in greater detail in FIG. 1) accommodated in the body roof 14 in order to hold the door 18 closed. The closing shackle 24 protrudes above the door surface and, on closing of the door 18, enters a wall opening 28 formed in the body roof 14 in a roof front wall 26. Through the wall opening 28, the closing shackle 24 can come into engagement with the latch assembly, which is concealed behind the roof front wall 26.

Figure 2:
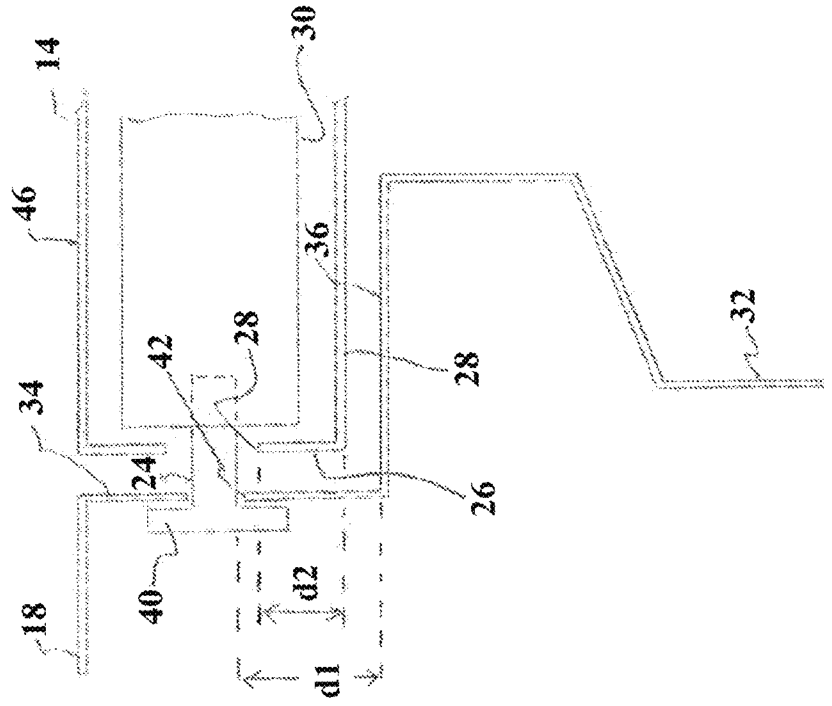
FIG. 2 shows, schematically, a detail of an exemplary embodiment of a domestic dishwashing machine in the installation region of a door latch of the dishwashing machine.

Reference will now additionally be made to FIG. 2. The detail illustrated in schematic simplified form therein can show a detail of the dishwashing machine 10 of FIG. 1, for which reason—where components that are the same or have the same action are concerned—the same reference numerals as in FIG. 1 have been used in FIG. 2.

In FIG. 2, the door 18 is shown in a closed or almost closed position, in which the closing shackle 24 enters the latch assembly—here designated 30—through the wall opening 28 of the roof front wall 26. The door 18 has on its door side that faces the dishwashing chamber 16 in the closed door position an inner lining 32 which is typically manufactured from sheet metal material and which, where the door 18 in the closed state is adjacent to the body roof 14, has a wall step formed by a wall portion 34 and a wall portion 36. The wall portion 34 extends substantially parallel to the plane of the door 18 and, on closing of the door 18, comes to lie in front of the roof front wall 26. The wall portion 36 extends transversely and in the example shown substantially perpendicularly to the wall portion 34 and protrudes relative to the wall portion 34 in the direction towards the dishwashing chamber 16 (when the door 18 is closed). On closing of the door 18, the wall portion 36 moves beneath the body roof 14, which is delimited on the underside of the roof by a roof bottom wall 38 which adjoins the roof front wall 26.

The closing shackle 24 is formed by a shackle body 40 which is inserted on the rear side through a wall aperture 42 formed in the wall portion 34, so that the closing shackle 24 protrudes from the wall portion 34 and, on closing of the door, is in advance of the wall portion 34. The shackle body 40 can be screwed or otherwise fastened to the inner lining 42. It will be seen that the closing shackle 24 is at a distance from the wall portion 36, wherein the gap, designated in FIG. 2 by a dimension d1, between the closing shackle 24 and the wall portion 36 can be, for example, approximately from 4 to 8 mm. The wall opening 28 is limited to the region of the roof front wall 26 and ends before the edge at which the roof front wall 26 adjoins the roof bottom wall 38. In other words, the wall opening 28 does not extend into the region of the roof bottom wall 38. The weakening effect that the wall opening 28 has on the structural stability of the body roof 14 is accordingly small. The lower opening edge of the wall opening 28 lies, for example, approximately from 3 to 5 mm above the transition edge from the roof front wall 26 to the roof bottom wall 38. The corresponding distance is designated d2 in FIG. 2.

For an exemplary form of the closing shackle 24 and of the latch assembly 30, reference will now be made to FIGS. 3 to 11. The latch assembly 30 has a frame 44, which can also be referred to as the main or outer housing of the latch assembly 30 and which, in the fitted state in the body roof 14, is fastened to a structural component of the machine body 12, for example to the roof bottom wall 38 or to the roof top wall (designated 46 in FIG. 2) which is located above the roof bottom wall and delimits the body roof 14 on the top side. For this fastening, the frame 44 is designed with suitable mounting structures, which in the example shown comprise one or more screw holes 45 (FIG. 4) which each serve to receive a fastening screw (not shown in greater detail). The frame 44 is thus fixed stationarily relative to the machine body 12 in the installed state. The latch assembly 30 additionally has a housing member 47, separate from the frame 44, which can also be referred to as the inner housing and is supported on the frame 44 so as to be pivotable. In the housing member 47 there is received a lever-like elongate closing member 48, also referred to as a closing lever hereinbelow, which, on closing of the door 18, comes into closing engagement with the closing shackle 24. In the example shown, the closing lever 48 is a one-piece component, for example produced from plastics material in an injection-moulding process. The longitudinal extent of the closing lever 48 runs from front to back from the point of view of an observer standing in front of the dishwashing machine 10. A front lever end of the closing lever 48 is therefore located close to the roof front wall 26, a rear lever end is located behind and at a distance therefrom.

Figure 3:
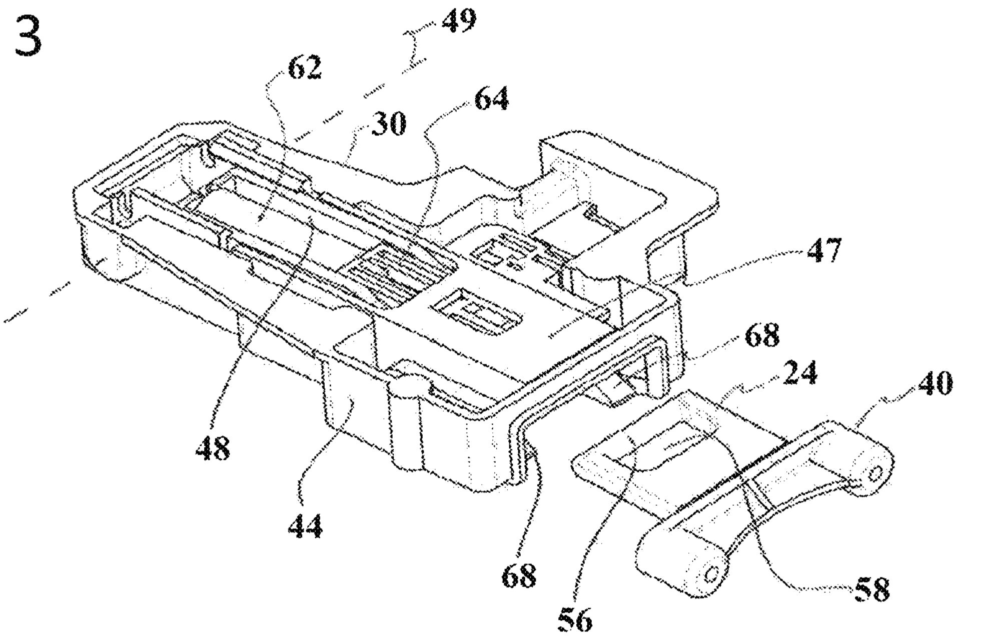
FIG. 3 shows, in perspective, an exemplary embodiment of a door latch which can be used in the dishwashing machines of FIGS. 1 and 2, having a latch assembly and a closing shackle as the main components of the door latch.
Figure 4:
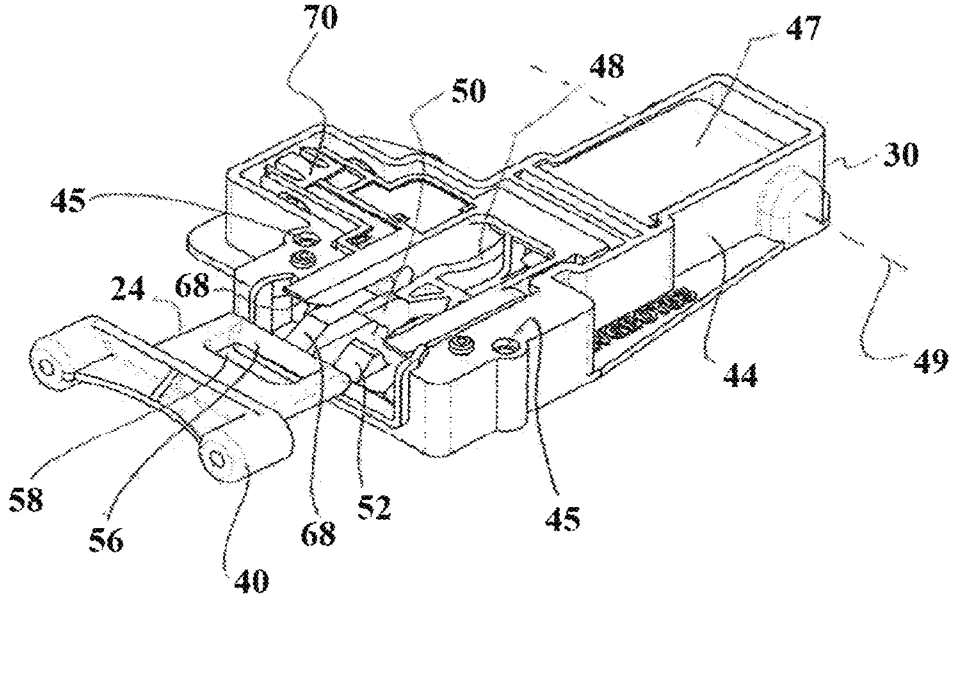
FIG. 4 shows the door latch of FIG. 3 in a different perspective.
Figure 11:
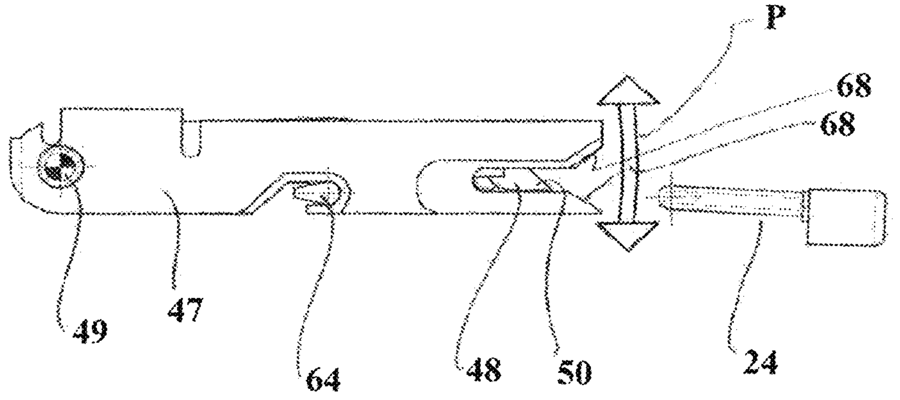
FIG. 11 is a view to illustrate the pivotability of a housing member, which receives the closing lever of FIG. 10, of the latch assembly of the exemplary embodiment of FIGS. 3 and 4.

The closing lever 48 is pivotable as a unit together with the housing member 47 relative to the frame 44. A pivot axis is depicted in FIGS. 3 and 4 at 49; in the installed state of the latch assembly 30, the pivot axis 49 runs horizontally. It crosses a rear end region of the housing member 47, for which reason, on pivoting of the housing member 47, the front end region thereof performs a vertical change of position. In FIG. 11, the pivotability of the housing member 47 with the closing lever 48 received thereon is illustrated by a double arrow P.

The closing lever 48 forms a gripping mouth 54 which is delimited by two jaws 50, 52 and arranged in the region of the front lever end, and which, on closing of the door 18, the closing shackle 24 enters with an advance shackle crosspiece 56 (advance as seen in the closing direction of the door 18). The shackle crosspiece 56 is oriented with its crosspiece longitudinal direction horizontal. Behind the shackle crosspiece 56, the closing shackle 24 forms a gripping recess 58 which, on closing of the door 18, one of the two jaws 50, 52 of the gripping mouth 54 enters and thereby comes into gripping engagement with the closing shackle 24. In the exemplary embodiment shown, it is the jaw 52 which enters the gripping recess 58 of the closing shackle 24 on closing of the door 18. The jaw 52 is the upper of the two jaws 50, 52 in the illustrations of FIGS. 5 to 9, for which reason it will also be referred to hereinbelow as the upper jaw. The jaw 50, on the other hand, will also be referred to hereinbelow as the lower jaw. In the exemplary embodiment shown, the lower jaw 50 is in the form of a double jaw, see FIG. 10.

Figure 5:
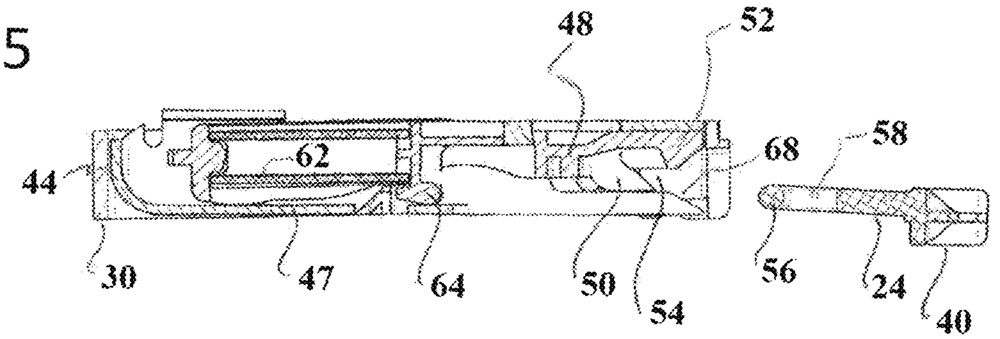
FIGS. 5 to 9 are sectional views of the door latch of FIGS. 3 and 4 in different operational arrangements.
Figure 6:
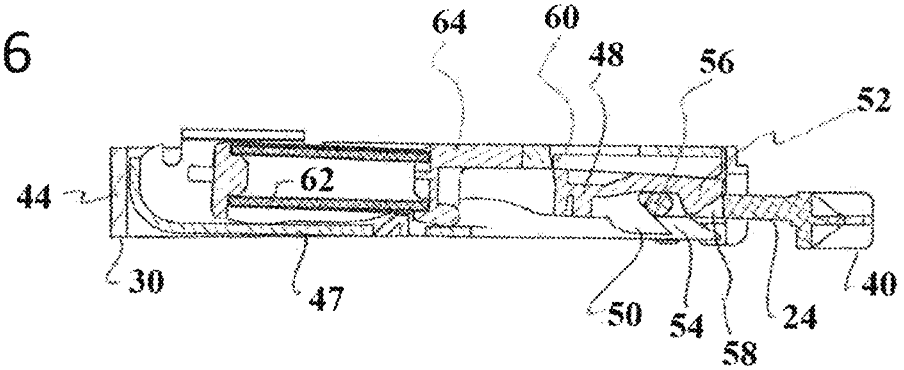

While the upper jaw 52 of the gripping mouth 54 serves to a certain extent as a gripping jaw which establishes the gripping engagement between the closing lever 48 and the closing shackle 24, the lower jaw 50 acts as a striking or contact jaw, against which the closing shackle 24 pushes with its shackle crosspiece 56 on closing of the door 18 and thereby initiates tilting of the closing lever 48 as a whole relative to the housing member 17 about a horizontal tilt axis, which in the example shown is located approximately in the region of the longitudinal centre of the closing lever 48. This tilt axis is not necessarily fixed stationarily relative to the housing member 47; the tilting movement of the closing lever 48 can to a certain extent be a floating tilting movement, in which the closing lever 48 performs a vertical tilting movement (downwards in the illustrations of FIGS. 5 to 9) with its front lever end and, according to the position of the centre of tilt, can perform with its rear lever end a vertical tilting movement in the opposite direction relative to the housing member 47. The purpose of the tilting is to free the closing lever 48 from blocking engagement with a blocking surface 60 formed on the housing member 47 or at least arranged stationarily relative to the housing member 47, on which blocking surface the closing lever 48 is supported in an open state of the latch assembly 30 (i.e. when the door 18 is open) and which, in the open state of the latch assembly 30, prevents the closing lever 48 from being driven backwards in the housing member 47 relative thereto by a tensioned closing spring 62. FIG. 5 shows the open state of the latch assembly 30, FIG. 6 shows a situation during closing of the door 18, in which the shackle crosspiece 56 has already been caught in the gripping mouth 54 (the upper jaw 52 engages into the gripping recess 58) and the closing lever 48 is tilted backwards slightly with its front lever end, so that it is at the point of losing blocking by the blocking surface 60.

Figure 7:
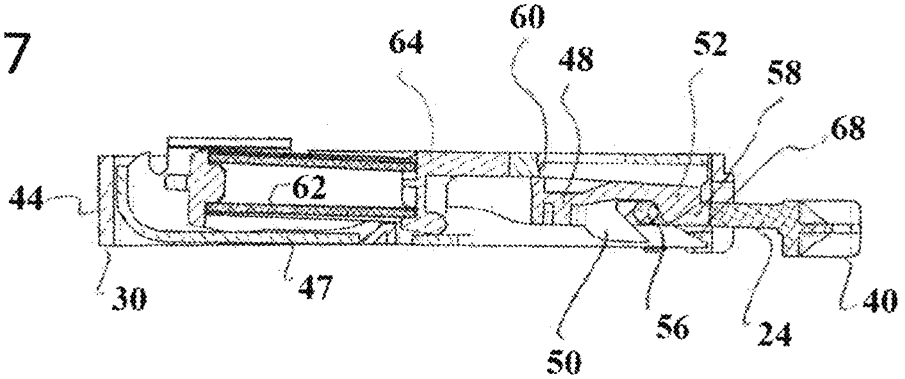
Figure 8:
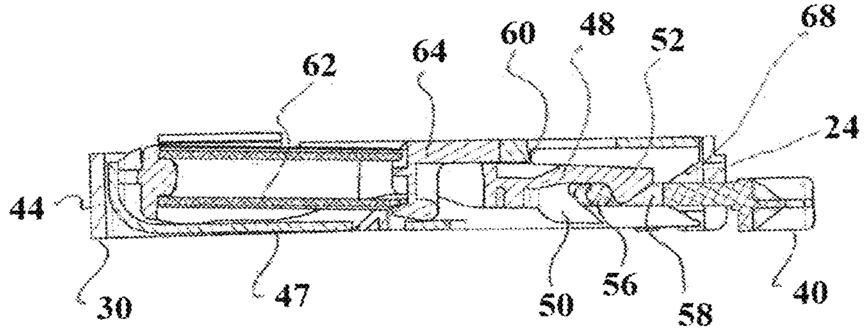

As soon as the closing lever 48 is freed from engagement with the blocking surface 60, the closing spring 62, which is formed, for example, by a helical compression spring, is able to relax and, as a result of its relaxation, urge the closing lever 48 as a whole backwards in the housing member 47 relative thereto. Owing to the engagement of the upper jaw 52 into the gripping recess 58, the closing lever 48 takes the closing shackle 24 with it as it moves back. This has an effect of pulling the door 18 shut. FIGS. 7 and 8 illustrate the pull-back movement of the closing lever 48 driven by the closing spring 62, wherein in FIG. 7 the closing lever 48 has performed only a portion of this pull-back movement and in FIG. 8 the closing lever 48 has reached its end position, which can be defined, for example, by the abutment of the closing lever 48 on the housing member 47. This end position of the closing lever 48 corresponds to a closed state of the latch assembly 30. By pulling on the closing shackle 24 (when the user attempts to open the door 18), the closing lever 48 as a whole, with compression of the closing spring 62, can be moved forwards relative to the housing member 47 and, by way of a tilting movement, in front of the blocking surface 60 again; consequently, by opening the door 18, the user can transfer the latch assembly 30 into its open state again.

Figure 9:
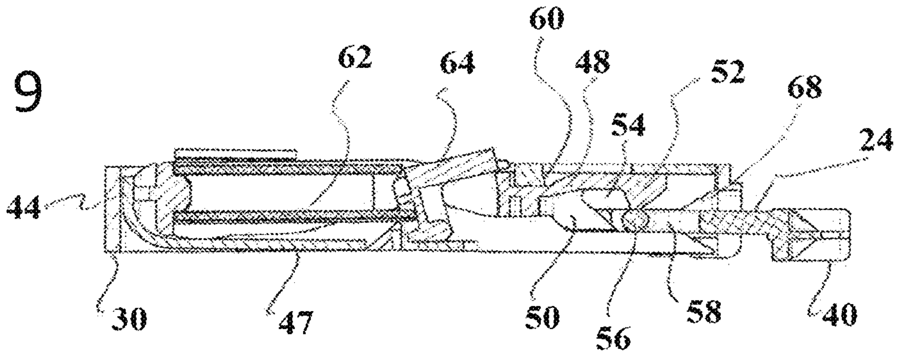
Figure 10:
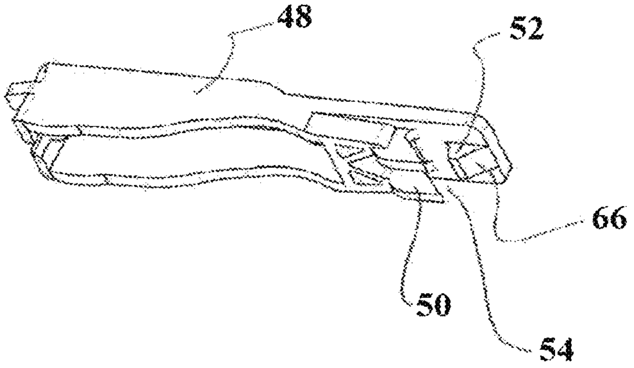
FIG. 10 shows, in perspective, a closing lever as part of the latch assembly of the exemplary embodiment of FIGS. 3 and 4.

FIG. 9 illustrates a self-healing function of the latch assembly 30. It cannot be ruled out that, through intentional or unintentional manipulation, the closing lever 48 is moved away from the blocking surface 60 in the open state of the latch assembly 30 and thereby snaps back in the housing member 47. The latch assembly 30 can thus move into its closed state while the door 18 is still open, without the closing shackle 24 having been inserted. The latch assembly 30 allows the closing shackle 24 to be inserted into the gripping mouth 54 of the closing lever 48 by a normal closing operation of the door 18, without the closing lever 48 first having to be pulled forwards for this purpose. Specifically, in the closed state of the latch assembly 30, the gripping mouth 54 is able to perform a vertical evading movement relative to the housing member 47. This compensating movement allows the approaching closing shackle 24 to enter the gripping mouth 54. The mentioned evading movement is made possible by a support member 64 which is movably supported on the housing member 47 and on which the closing spring 62 is in turn supported. If the user, in the closed state of the latch assembly 30 with the door 18 still open, wishes to activate the self-healing function and closes the door 18, the closing shackle 24 first pushes against a sloping surface 66 (FIG. 9) on the outside of the upper jaw 52 of the gripping mouth 54. This generates a tilting moment on the closing lever 48, which attempts to deflect the gripping mouth 54 vertically upwards (based on the illustration in FIG. 9) relative to the housing member 47. Owing to the movable deflectability of the support member 64, the closing lever 48 can give way to the tilting moment generated by the closing shackle 24, so that the closing shackle 24 can slip with its shackle crosspiece 56 into the gripping jaw 54. FIG. 9 shows the moment at which the shackle crosspiece 56 moves past the upper jaw 52 in the direction into the gripping mouth 54. After the shackle crosspiece 56 has entered the gripping mouth 54, the closing lever 48 tilts relative to the housing member 47 back into the position according to FIG. 8 again; by pulling on the door 18, the latch assembly 30 can then be brought into its usual open state again.

Mounting tolerances of the closing shackle 24 relative to the door 18 or/and mounting tolerances of the door 18 relative to the machine body 12 can have the result that, in different machines of a series of dishwashing machines 10 of the type shown in FIG. 1, the closing shackle 24, on closing of the door 18, does not always enter the wall opening 28 formed in the roof front wall 26 exactly at a given defined vertical position. The explained pivotable mounting of the housing member 47 (and thus of the pivot lever 48) on the frame 44 serves to compensate for such mounting-induced position tolerances of the closing shackle 24. A plurality of centring bevels 68 are thereby formed on the housing member 47, which centring bevels permit vertical self-alignment of the housing member 47 with the closing shackle 24. If the housing member 47 is misaligned, the closing shackle 24, on closing of the door, can first strike against at least one of the centring bevels 68 before the closing shackle 24 pushes against the closing lever 48 and triggers the relaxation thereof. The striking of the closing shackle against the centring bevel 68 leads to pivoting of the housing member 47 about the pivot axis 49; the misalignment is eliminated by this pivoting. Together with the housing member 47, the closing lever 48 located in the housing member 47 also performs a vertical aligning movement with its front lever end and, after carrying out the aligning movement, is ready for correctly positioned insertion of the closing shackle 24 into the gripping mouth 54.

The housing member 47 is additionally the carrier of components of an electric switch which, on closing of the door 18, changes its switching state and thereby signals the door state (open or closed) to a controller. These switch components are accommodated in a lateral housing prolongation 70 of the housing member 47 (FIG. 4). During the described self-alignment of the housing member 47 relative to the closing shackle 24, the electric switch accommodated in the housing prolongation 70 therefore moves together with the housing member 47. The housing member 47, the closing lever 48 and the electric switch are consequently pivotable as a unit relative to the frame 44.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A domestic dishwashing machine, comprising:

a machine body having a dishwashing chamber formed therein;

a door for closing the dishwashing chamber, which door is mounted on the machine body so as to be pivotable about a horizontal pivot axis proximate to a floor; and a door latch for holding the door closed, having a latch assembly installed in a body roof above the dishwashing chamber, wherein the latch assembly comprises a one-piece closing member arranged so as to be movable between an open position and a closed position, and a closing spring arrangement which is supported on the closing member and which, in the open position of the closing member, urges the closing member into blocking engagement with a blocking surface, which blocking engagement prevents relaxation of the closing spring arrangement, wherein the closing member has a contact surface for a blocking-release element which, on closing of the door, pushes against the contact surface and thereby frees the closing member from blocking engagement with the blocking surface, wherein the closing member, on closing of the door, comes into gripping engagement with an engagement structure arranged on the door and pulls the door shut under the action of the relaxing closing spring arrangement, wherein the engagement structure is formed by a closing shackle, the closing shackle forming the blocking-release element and protruding from a first wall portion, extending substantially parallel to the plane of the door, of an inner lining of the door, and wherein the closing shackle has a shackle crosspiece which extends substantially horizontally and is in advance on closing of the door and behind which the closing member engages on closing of the door, and wherein, on closing the door, the shackle crosspiece initiates a tilting of the closing member as a whole relative to the housing member about a horizontal tilt axis, wherein the horizontal tilt axis is not fixed stationarily so that a tilting movement of the closing member is to a certain extent a floating tilting movement.

2. The domestic dishwashing machine according to claim 1, wherein the closing shackle is inserted from behind through a wall aperture in the first wall portion.

3. The domestic dishwashing machine according to claim 1, wherein the inner lining has a wall step which is formed by the first wall portion and a second wall portion extending transversely relative to the door plane beneath the closing shackle, and wherein a gap is formed between the closing shackle and the second wall portion.

4. The domestic dishwashing machine according to claim 3, wherein the gap is no less than 2 mm or no less than 3 mm.

5. The domestic dishwashing machine according to claim 1, wherein the body roof has a front wall provided with a wall opening which the closing shackle enters on closing of the door, wherein a roof bottom wall adjoins the front wall at an underside of the body roof, and wherein the wall opening ends before the front wall transitions into the roof bottom wall.

6. The domestic dishwashing machine according to claim 5, wherein the wall opening ends no less than 1 mm or no less than 2 mm before the front wall transitions into the roof bottom wall.

7. The domestic dishwashing machine according to claim 1, wherein the closing member forms a gripping mouth for the closing shackle, which gripping mouth is formed by an upper and a lower jaw structure, wherein one of the two jaw structures forms the contact surface and the other jaw structure engages behind the shackle crosspiece of the closing shackle on closing of the door.

8. The domestic dishwashing machine according to claim 1, wherein the striking of the closing shackle against the contact surface of the closing member on closing of the door initiates a tilting of the closing member that leads to the release of the blocking engagement, and a subsequent relaxation of the closing spring arrangement is effective to cause a substantially translational displacement of the closing member in a direction deeper into the body roof into the closed position of the closing member, wherein both the tilting and the translational displacement are carried out by the closing member as a whole.

9. The domestic dishwashing machine according to claim 1, wherein the latch assembly comprises a frame having mounting structures for fastening the frame to a structural component of the body roof, wherein the latch assembly further comprises a housing member which is supported on the frame and in which the closing member is arranged so as to be movable between its open position and its closed position, wherein the blocking surface is arranged stationarily relative to the housing member, and wherein the housing member is supported on the frame so as to be movable, in particular pivotable, relative thereto, such that, when the door is open, a change of position, in particular a vertical change of position, of the contact surface of the closing member relative to the frame can be brought about by movement of the housing member relative to the frame.

10. The domestic dishwashing machine according to claim 9, wherein the housing member is pivotably supported on the frame, such that, when the door is open, a vertical change of position of the contact surface of the closing member relative to the frame can be brought about by movement of the housing member relative to the frame.

11. A domestic electrical appliance comprising:

an appliance body having a process chamber formed therein;

a door for closing the process chamber, which door is movably mounted on the appliance body; and a door latch for holding the door closed, wherein the door latch comprises a latch assembly installed in the appliance body, wherein the latch assembly comprises a frame having mounting structures for fastening the frame to a structural component of the appliance body, wherein the latch assembly further comprises a housing member supported on the frame, a closing member arranged in the housing member so as to be movable between an open position and a closed position, and a closing spring arrangement supported on the closing member, wherein, in the open position of the closing member, the closing spring arrangement urges the closing member into blocking engagement with a blocking surface arranged stationarily relative to the housing member, which blocking engagement prevents relaxation of the closing spring arrangement, wherein the closing member has a contact surface for a blocking-release element which is arranged on the door and which, on closing of the door, pushes against the contact surface and thereby frees the closing member from blocking engagement with the blocking surface, wherein, on closing of the door, the closing member comes into gripping engagement with an engagement structure arranged on the door and pulls the door shut under the action of the relaxing closing spring arrangement, wherein the housing member is supported on the frame so as to be movable relative thereto, such that, when the door is open, a change of position of the contact surface of the closing member relative to the frame can be brought about by movement of the housing member relative to the frame, and wherein the closing member is freed from the blocking engagement by a tilting of the closing member about a tilt axis, wherein the tilt axis is not fixed stationarily so that a tilting movement of the closing member is to a certain extent a floating tilting movement.

12. The domestic electrical appliance according to claim 11, wherein there is formed on the housing member at least one centering bevel which serves to cooperate with the blocking-release element on closing of the door in order to center the housing member relative to the blocking-release element.

13. The domestic electrical appliance according to claim 11, wherein the housing member is supported on the frame so as to be pivotable relative thereto and, by pivoting, makes possible a vertical change of position of the contact surface.

14. The domestic electrical appliance according to claim 11, wherein the domestic electrical appliance is a dishwashing machine.

* * * * *